US012389466B2

(12) United States Patent
Vega et al.

(10) Patent No.: US 12,389,466 B2
(45) Date of Patent: Aug. 12, 2025

(54) METHODS OF AND DEVICES FOR ENABLING A CORE NETWORK OF A MOBILE COMMUNICATION NETWORK TO PERFORM MOBILITY ACTIONS BASED ON A RADIO ACCESS TECHNOLOGY, RAT, WITH WHICH A USER EQUIPMENT, UE, CONNECTS TO SAID CORE NETWORK

(71) Applicant: Telefonaktiebolaget LM Ericsson (publ), Stockholm (SE)

(72) Inventors: Veronica Sanchez Vega, Madrid (ES); Marcus Ihlar, Älvsjö (SE); Miguel Angel Muñoz De La Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 569 days.

(21) Appl. No.: 17/639,665

(22) PCT Filed: Oct. 24, 2019

(86) PCT No.: PCT/EP2019/079038
§ 371 (c)(1),
(2) Date: Mar. 2, 2022

(87) PCT Pub. No.: WO2021/047785
PCT Pub. Date: Mar. 18, 2021

(65) Prior Publication Data
US 2022/0295580 A1    Sep. 15, 2022

(30) Foreign Application Priority Data

Sep. 9, 2019 (EP) .................................... 19382777

(51) Int. Cl.
*H04W 76/12*  (2018.01)
*H04W 88/06*  (2009.01)

(52) U.S. Cl.
CPC ............ *H04W 76/12* (2018.02); *H04W 88/06* (2013.01)

(58) Field of Classification Search
CPC ..... H04W 76/12; H04W 76/16; H04W 88/06; H04W 88/08; H04W 88/16; H04W 92/045; H04W 92/24
See application file for complete search history.

(56) References Cited

FOREIGN PATENT DOCUMENTS

| CA | 3049317 A1 | 7/2018 |
|---|---|---|
| CN | 108029037 A | 5/2018 |

(Continued)

OTHER PUBLICATIONS

"Technical Specification Group Services and System Aspects; General Packet Radio Service (GPRS) enhancements for Evolved Universal Terrestrial Radio Access Network (E-UTRAN) access", 3GPP TS 23.401 V16.2.0 (Mar. 2019) (Year: 2019).*

(Continued)

*Primary Examiner* — Ayaz R Sheikh
*Assistant Examiner* — David Zhijun Sun
(74) *Attorney, Agent, or Firm* — Murphy, Bilak & Homiller, PLLC

(57) ABSTRACT

A method of enabling the core network to determine the RAT type in a dual connection non-standalone configuration. The RAT type is either embedded in the GTP-U header by the RAN which is then extracted by the PGW-U or it is derived by the PGW-U by using a Reinforcement Language Agent activated by the SPR, through the PCRF and the PGW-C.

7 Claims, 5 Drawing Sheets

(56) References Cited

FOREIGN PATENT DOCUMENTS

| CN | 109246778 A | 1/2019 | |
|---|---|---|---|
| EP | 3425940 A1 * | 1/2019 | ......... B29C 37/0082 |
| WO | 2017150034 A1 | 9/2017 | |
| WO | WO-2018230794 A1 * | 12/2018 | ............ H04W 28/06 |
| WO | WO-2018232605 A1 * | 12/2018 | ........ H04W 36/0033 |

OTHER PUBLICATIONS

3GPP, "3GPP TR 21.915 V1.2.0", 3rd Generation Partnership Project; Technical Specification Group Services and System Aspects; Release 15 Description; Summary of Rel-15 Work Items (Release 15), Aug. 2019, 1-120.

3GPP, "3GPP TS 23.401 V16.2.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Mar. 2019, 1-418.

3GPP, "3GPP TS 37.340 V15.5.0", 3rd Generation Partnership Project; Technical Specification Group Radio Access Network; Evolved Universal Terrestrial Radio Access (E-UTRA) and NR; Multi-connectivity; Stage 2 (Release 15), Mar. 2019, 1-68.

Unknown, Author , "Procedures for Inter-RAT mobility support to and from NB-IoT", 3GPP TSG-SA WG2 Meeting #130 S2-1900630, Kochi, India, Jan. 21-25, 2019, 1-51.

* cited by examiner

METHODS OF AND DEVICES FOR ENABLING A CORE NETWORK OF A MOBILE COMMUNICATION NETWORK TO PERFORM MOBILITY ACTIONS BASED ON A RADIO ACCESS TECHNOLOGY, RAT, WITH WHICH A USER EQUIPMENT, UE, CONNECTS TO SAID CORE NETWORK

TECHNICAL FIELD

The present disclosure generally relates to the field of mobile communication networks and, more specifically, to mobility actions performed by the mobile communication network based on the Radio Access Technology, RAT, with which a User Equipment, UE, is connected to the core network.

BACKGROUND

3GPP has defined different deployment scenarios for upcoming 5G networks, for example Non Standalone scenarios and Standalone scenarios.

The Non standalone scenario to be deployed by incumbent network operators is a basic migration from an existing fourth Generation network to a fifth Generation network. This scenario is also called 5G NSA Option 3, where there is no 5G Core network and the New Radio, NR, i.e. the 5G Radio Access Network, RAN, is connected to 5G Evolved Packet Core, EPC, i.e. 3GPP Rel15 version of existing EPC, and where the User Equipment supports dual connectivity both to Long Term Evolution, LTE, i.e. 4G RAN, and to NR, i.e. 5G RAN. Reference is made to 3GPP TS 23.401, Section 4.3.2a for more details.

This particular disclosure focuses on the 5G Non-Standalone, NSA, Option 3 scenario and can apply to any other LTE/NR interworking solution based on Multi-Radio Dual Connectivity, such as interworking solutions option 1, 2, 4 and 7, where a multiple Rx/Tx UE may be configured to use resources provided by two different nodes connected via non-ideal backhaul, one providing NR access and the other one providing either E-UTRA or NR access. Reference is made to 3GPP TS 37.340 for more details on MR-DC.

In the case of 5G NSA Option 3 deployment, as explained in 3GPP TS 23.401, it is current not possible for the operator's core network to know which is the Radio Access Technology, RAT, Type the UE is connected to at any point in time during an IP-CAN session. In fact, in 5G NSA Option 3 deployment, currently, RAT Type is always set to LTE even if traffic is served by a secondary radio bearer on NR or traffic is split between LTE and NR radio bearers, and it is not possible to differentiate between 5G NSA and 4G users.

Operator's core network, for example the Mobility Management Entity, MME, could know if an IP-CAN session has Dual Connectivity configured, i.e. has a Secondary RAT configured, but cannot know which Access is used at a given time. In addition, 3GPP TS 37.340, see section 10.11 has defined a new procedure for master NodeB, i.e. eNB in case of option 3, to report periodically the secondary RAT PDCP volume usage, i.e. eNB in case of option 3, and report to MME/PGW as an alternative to PGW-U usage monitoring.

Such above described charging solution is dependent on Radio Access Network, RAN, support, low reporting period impact NB performance, and NB traffic scheduling processing which is key to support low latency traffics, and is not aligned with existing charging which is based on IP layer and can be customized based on PGW service detection and transport protocol header observation, e.g. report volume when NR and exclude TCP retransmits.

Aside of the charging Use Case, PGW-U supports different enforcement actions which could be significantly improved if the actual RAT Type is known, e.g:

User plane traffic optimization, which could benefit from a tailored optimization profile based on the actual RAT Type.

Charging and Reporting, where the URR reports, and consequently the CDRs, could benefit from including the actual RAT Type, e.g. which traffic volume is carried over 4G RAN or 5G RAN.

SUMMARY

In a first aspect of the present disclosure, there is presented a method of enabling a Gateway User plane, GW-U, node in a core network of a mobile communication network to perform mobility operations based on a type of Radio Access Technology, RAT, used by a User equipment, UE, for conveying Internet Protocol, IP, user data over an IP Connectivity Access Network, IP CAN, bearer in an IP CAN session between said UE and an external IP network.

The method comprises the steps of:

receiving, by a Gateway Control plane, GW-C, node, a Session Create message for creating said IP CAN session between said UE and said external IP network;

transmitting, by said GW-C node, an Establishment Request message towards a Policy and Charging Rules Function, PCRF, node, for retrieving policies for said IP CAN session;

receiving, by said GW-C node, an Establishment Response message, wherein said Establishment Response message comprises an indication that said core network intends to perform mobility actions based on a type of RAT used by said UE for conveying said IP user data over said IP CAN bearer in said IP CAN session between said UE and said external IP network;

selecting, by said GW-C node, a Gateway User plane, GW-U, node, based on said indication;

transmitting, by said GW-C node, a Session Establishment Request message to said selected GW-U node, wherein said Session Establishment Request message comprises said indication.

The inventors have found that, during the establishment of an IP CAN session between the UE and the external IP network, a Gateway User plane, GW-U, node should be selected that is capable of dealing with a UE capable of dual connectivity.

As such, the Gateway Control plane, GW-C, node should be informed that the core network, for example the GW-U node, intends to perform mobility actions based on a type of RAT used by the UE for conveying any IP user data over the IP CAN bearer in the IP CAN session between the UE and the external IP network.

The GW-C node is then able to select an appropriate GW-U node, i.e. a GW-U node that is able to cope with a UE that is dually connected to the core network. The GW-U node may then, for example, perform the mobility actions based on the type of RAT used by the UE for conveying the IP user data over the IP CAN bearer in the IP CAN session between the UE and the external IP network.

In accordance with the present disclosure the external IP network may be a public IP network like the internet.

An IP-CAN, or IP connectivity access network, is an access network that provides Internet Protocol, IP, connectivity. The term is usually used in cellular context and usually refers to 3GPP access networks such as GPRS or EDGE, but can be also used to describe wireless LAN, WLAN, or DSL networks. It was introduced in 3GPP IP Multimedia Subsystem, IMS, standards as a generic term referring to any kind of IP-based access network as IMS put much emphasis on access and service network separation.

The method in accordance with the present disclosure is especially advantageous because network operators may be enabled to apply different enforcement actions based on the current RAT type, specifically in the case of Dual Connectivity in the 5G NSA option 3 scenario.

An enforcement action may, for example, be related to user plane traffic optimization, where the TCP/QUIC optimization profile depends on the actual RAT type.

Another enforcement action may, for example, be related to charging/reporting per RAT type, i.e. reporting of service usage in a given RAT, or service chaining counters of users in a given RAT, that could be used for licensing of external SFs.

The presented method may further avoid the need for statically pre-configured traffic optimization actions. The method allows to adapt to changing network environment, e.g. change of RAT type, and traffic characteristics.

No human intervention is needed, the method may run autonomously and the method also work for encrypted traffic.

A RAT type, in accordance with the present disclosure may be considered as the underlying physical connection for a UE towards the core network of the wireless communication network, such as. Example technologies being UTRA, UMTS Terrestrial Radio Access, CDMA2000, WiFi, GERAN, GSM EDGE Radio Access Network, LTE, Long Term Evolution, New Radio, NR, etc. Typically, the presented disclosure is directed to a dual connectivity capable UE which is capable to have two simultaneous connections, one to an LTE access network and one to a NR access network.

In an example, the indication is one of:
an indication that an access node in a Radio Access Network, RAN, is to insert type of RAT in said IP user data packet;
an indication that an Gateway User plane node is to determine said RAT type by implementing a Reinforcement Learning Agent, RLA, operating with an observation space comprising possible RAT types, a reward space comprising a reward referring to said RAT type, and an action space comprising a set of user plane traffic enforcement actions.

The indication may, for example, be inserted by the access node in the Radio Access Network, RAN, in the IP user data packet. The access node is, for example, an eNodeB in case of a 4G RAN network, i.e. LTE, or a gNodeB in case of a 5G RAN network, i.e. NR.

Another option is that the Gateway User plane node is to determine the RAT type by implementing a Reinforcement Learning Agent, RLA, operating with an observation space comprising possible RAT types, a reward space comprising a reward referring to the RAT type, and an action space comprising a set of user plane traffic enforcement actions. The above is basically an adequate process for estimating, by the Gateway User plane node, the RAT used by the UE for connecting to the core network. This aspect is explained in more detail with reference to the figures.

In accordance with the present disclosure, the PCRF may support different functionality related to policy control and specifically in the context of this disclosure, PCRF supports retrieving the subscriber policy profile from SPR and installing the corresponding PCC rule/s with the requested enforcement actions towards PGW-C using the Gx interface.

The PGW-C node may support different functionality, and specifically in the context of this disclosure, PGW-C retrieves from PCRF the PCC rule/s through Gx interface. PGW-C also activates in PGW-U the corresponding PDRs, to identify the target application/s, and enforcement actions, FARs/QERs/URRs, through the PFCP protocol, Sx interface.

The PGW-U node may support different functionality, and specifically in the context of this disclosure, PGW-U supports handling of user plane traffic, including packet inspection, based on PDRs provisioned by PGW-C, and different enforcement actions, based on FARs/QERs/URRs provisioned by PGW-C.

In a second aspect of the present disclosure, there is provided a method of performing mobility operations, in a mobile communication network, based on a type of Radio Access Technology, RAT, used by a User equipment, UE, for conveying Internet Protocol, IP, user data over an IP Connectivity Access Network, IP CAN, bearer in an IP CAN session between said UE and an external IP network.

The method comprises the steps of:
receiving, by a Gateway User plane, GW-U, node, over an IP CAN bearer, an IP user data packet;
determining, by said GW-U node, said RAT type used by said UE for conveying said IP user data, and determining a rule applicable for said IP user data packet based on said determined RAT type;
performing, by said GW-U node, a mobility operation based on said applicable rule.

The above described aspect of the present disclosure is based on the same inventive concept as the first aspect of the present disclosure, but then seen from the perspective of the Gateway User plane, GW-U, node.

As such, the GW-U node, which is selected by the GW-C node, received an IP user data packet over the IP CAN bearer. The GW-U node is to determine the RATY used by the UE for conveying the IP user data, and is to determine a rule applicable for the IP user data packet based on the determined RAT type. Finally, the mobility operation based on the applicable rule is performed by the GW-U node.

In this respect, the step of determining the RAT type may comprise any of:
retrieving, by said GW-U node, said RAT type from said IP user data packet;
determining, by said GW-U node, said RAT type by implementing a Reinforcement Learning Agent, RLA, operating with an observation space comprising possible RAT types, a reward space comprising a reward referring to said RAT type, and an action space comprising a set of user plane traffic enforcement actions.

In a third aspect, there is provided a method of informing a core network of a mobile communication network of a type of Radio Access Technology, RAT, used by a User Equipment, UE, for conveying Internet Protocol, IP, user data over an IP Connectivity Access Network, IP CAN, bearer in an IP CAN session between said UE and an external IP network, wherein said method comprises the steps of:
receiving, by an access node in a Radio Access Network, RAN, an IP user data packet;
inserting, by said access node, said type of RAT in said IP user data packet;
forwarding, by said access node, over said IP CAN bearer, said IP user data packet to said core network thereby informing said core network of said RAT used for conveying said IP user data.

The above described aspect describes the situation in which the access node in the Radio Access Network inserts the type of RAT in the IP user data packet.

Here, the step of inserting may comprise:
  inserting, by said access node, said type of RAT in a GTP-U header of said IP user data packet.

It is noted that in any of the methods in accordance with the present disclosure, the IP-CAN session has Dual Connectivity configured such that said UE is able to connect to said core network using two types of RAT's.

In a further example, the mobile communication network is a fifth Generation, Non-Standalone based mobile communication network.

In a further aspect of the present disclosure, there is provided a Gateway Control plane, GW-C, node for enabling a Gateway User plane, GW-U, node in a core network of a mobile communication network to perform mobility operations based on a type of Radio Access Technology, RAT, used by a User equipment, UE, for conveying Internet Protocol, IP, user data over an IP Connectivity Access Network, IP CAN, bearer in an IP CAN session between said UE and an external IP network.

The GW-C node comprises:
  receive equipment arranged for receiving a Session Create message for creating said IP CAN session between said UE and said external IP network;
  transmit equipment arranged for transmitting an Establishment Request message towards a Policy and Charging Rules Function, PCRF, node, for retrieving policies for said IP CAN session;
  wherein said receive equipment is further arranged for receiving an Establishment Response message, wherein said Establishment Response message comprises an indication that said core network intends to perform mobility actions based on a type of RAT used by said UE for conveying said IP user data over said IP CAN bearer in said IP CAN session between said UE and said external IP network;
  and wherein said GW-C node further comprises:
  process equipment arranged for selecting a Gateway User plane, GW-U, node, based on said indication;
  and wherein said transmit equipment is further arranged for transmitting a Session Establishment Request message to said selected GW-U node, wherein said Session Establishment Request message comprises said indication.

It will be appreciated that the equipment disclosed may be implemented as separate hardware and/or software modules and devices, and/or may be implemented as a cloud service, and/or controlled by or executed in a processor or the like.

For a communication network comprised by a Fifth Generation, 5G, mobile communications network, in an embodiment, any of the nodes in the communication network may be arranged for operating as a an Application Function, AF, of a Service Based Architecture, SBA, domain in a core network of the 5G mobile communications network.

In a further example, the indication is one of:
  an indication that an access node in a Radio Access Network, RAN, is to insert type of RAT in said IP user data packet;
  an indication that an Gateway User plane node is to determine said RAT type by implementing a Reinforcement Learning Agent, RLA, operating with an observation space comprising possible RAT types, a reward space comprising a reward referring to said RAT type, and an action space comprising a set of user plane traffic enforcement actions.

In a further aspect, there is provided a Gateway User plane, GW-U, node, arranged for performing mobility operations, in a mobile communication network, based on a type of Radio Access Technology, RAT, used by a User equipment, UE, for conveying Internet Protocol, IP, user data over an IP Connectivity Access Network, IP CAN, bearer in an IP CAN session between said UE and an external IP network.

The GW-U node comprises:
  receive equipment arranged for receiving, over an IP CAN bearer, an IP user data packet;
  process equipment arranged for determining said RAT type used by said UE for conveying said IP user data, and determining a rule applicable for said IP user data packet based on said determined RAT type, and for performing a mobility operation based on said applicable rule.

In an example, the process equipment is arranged for determining said RAT type by any of:
  retrieving, by said GW-U node, said RAT type from said IP user data packet;
  determining, by said GW-U node, said RAT type by implementing a Reinforcement Learning Agent, RLA, operating with an observation space comprising possible RAT types, a reward space comprising a reward referring to said RAT type, and an action space comprising a set of user plane traffic enforcement actions.

In yet another aspect, there is provided an access node in a Radio Access Network, RAN, for informing a core network of a mobile communication network of a type of Radio Access Technology, RAT, used by a User Equipment, UE, for conveying Internet Protocol, IP, user data over an IP Connectivity Access Network, IP CAN, bearer in an IP CAN session between said UE and an external IP network.

The access node comprises:
  receive equipment arranged for receiving an IP user data packet;
  insert equipment arranged for inserting said type of RAT in said IP user data packet;
  transmit equipment arranged for forwarding, over said IP CAN bearer, said IP user data packet to said core network thereby informing said core network of said RAT used for conveying said IP user data.

In a further example, the insert equipment is further arranged for inserting said type of RAT in a GTP-U header of said IP user data packet.

In yet another aspect, there is provided a computer program product comprising a computer readable medium having instructions stored thereon which, when executed on a node in a mobile communication network, cause said node to implement a method in accordance with any of the examples as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

Figure 1:
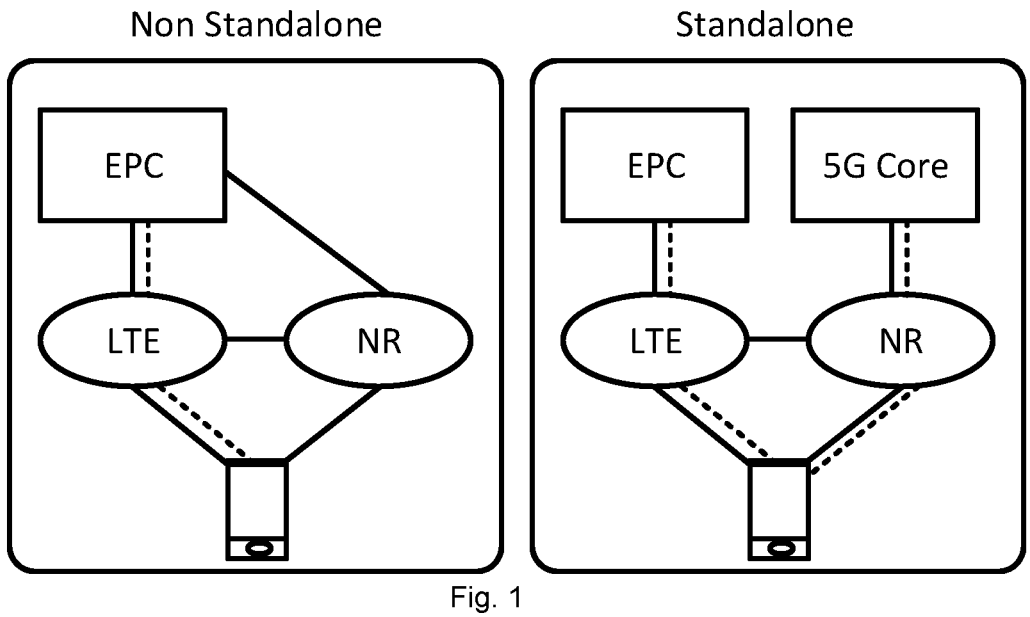
FIG. 1 discloses deployment scenarios for different communication networks.

FIG. 1 discloses two different deployment scenarios for the fifth Generation, 5G, communication networks, i.e. a Non Standalone one as depicted on the left side of FIG. 1 and a Standalone one as depicted on the right side of FIG. 1.

In a Non Standalone deployment scenario, the communication network comprises a single core network being the 4G Evolved Packet Core, EPC, network. A particular UE may connect to the EPC network using two different Radio Access Networks, RAN's. In a first example, the UE may connect to the core network using the traditional 4G RAN being the Long Term Evolution, LTE, RAN. In a second example, the UE may connect to the core network using the upcoming 5G RAN access network, being the New Radio, NR, RAN. The LTE network and the NR network may communicate with each other for a variety of purposes.

Further, the UE may be a dual connectivity capable UE, wherein the UE is able to connect to the EPC in a dual manner, namely via the LTE and via the NR at the same time.

In a Standalone deployment scenario, as shown on the right side of FIG. 1, the communication network comprises two separated core networks being the 4G Evolved Packet Core, EPC, network and the 5G Core network. The 5G Core network is accessible via the NR Radio Access Network, RAN, and the EPC network is accessible via the LTE RAN. In this particular scenario, there is no need for the LTE RAN to directly communicate with the NR RAN.

The present disclosure is directed to the Non-Standard deployment scenario as depicted on the left side of FIG. 1. Currently, it's not possible for the operator's core network to know the Radio Access Technology, RAT, type the UE is connected to an any point in time during an IP-CAN session. In fact, the RAT type is set to LTE even if traffic is served by a secondary radio bearer on NR or traffic is split between LTE and NR radio bearers. It's currently not possible to differentiate between 5G Non-Standalone users and 4G users.

The present disclosure is directed to the concept that the Gateway control plane node selects a Gateway User plane node based on an indication that the core network intends to perform mobility actions based on a type of RAT used by the UE for conveying the IP user data over the IP CAN bearer in an IP CAN session between the UE and the external IP network.

In one of the options the RAT type is signalled to the core network. The RAN may mark an GTP-U header with the RAT type conveying the user traffic packets.

At IP-CAN session establishment/modification, the Dual Connectivity indication may provided by the MME to the PCRF, PGW-C and PGW-U, by extending S11, Gx and Sx (PFCP) protocols.

The RAN Exposure of the RAT Type may be a feature negotiated by

RAN and Core Network on a per user's IP-CAN session basis, specifically in case of Dual Connectivity. Both the indication of Dual Connectivity and the activation of the GTP-U marking functionality may be conveyed to PGW-U via PGW-C upon user's IP-CAN session establishment/modification, by extending Gx and Sx (PFCP) protocols.

Finally, during the IP-CAN session, the RAN, for example 4G RAN or 5G RAN, may mark the GTP-U header with the RAT Type conveying the user traffic packets.

Figure 3:
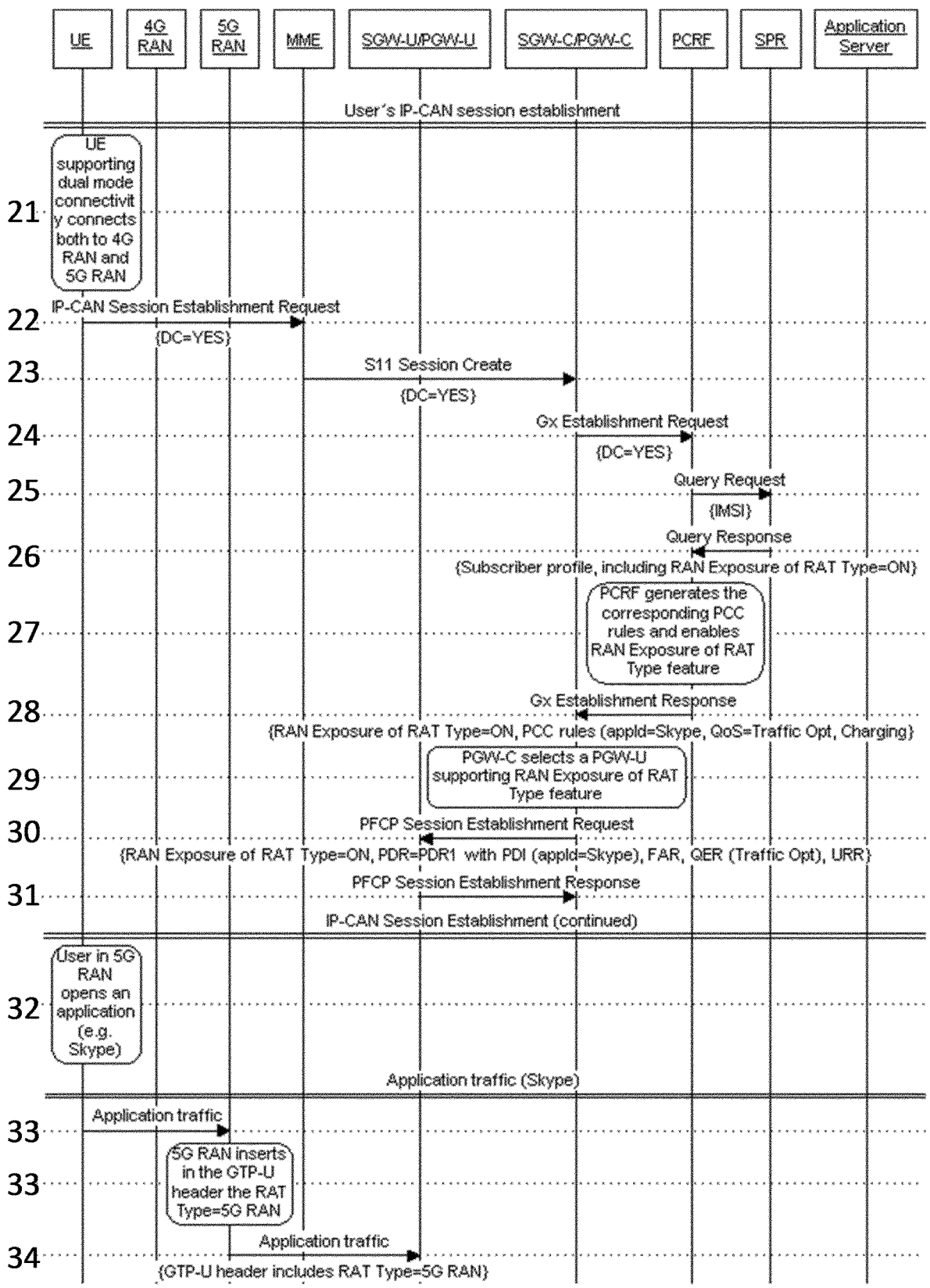
FIGS. 3 and 4 disclose a sequence diagram in which the access node inserts the RAT type in the packets originating from the UE, in accordance with the present disclosure.
Figure 4:
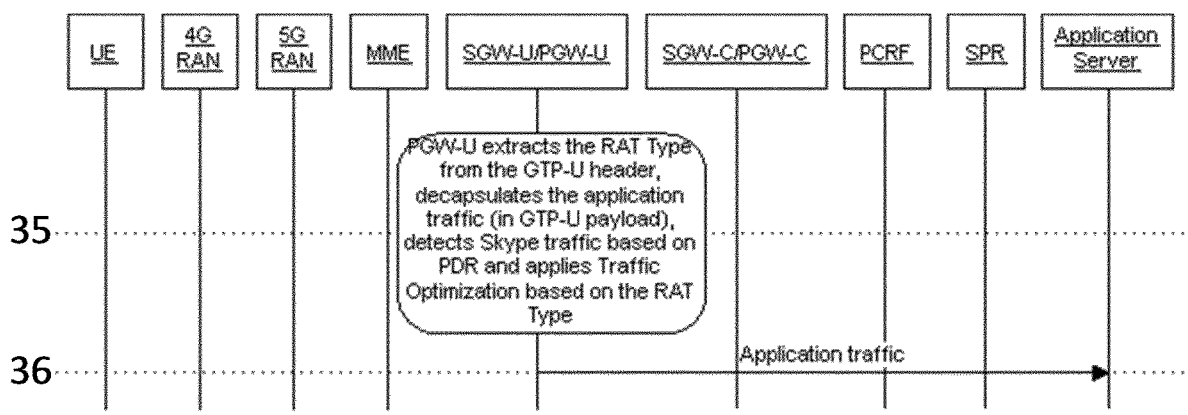

The above described option wherein the RAN introduces the indication in the traffic conveyed is explained in more detail with respect to FIGS. 3 and 4.

In another option, the RAT type is based on a reinforcement learning principle.

At IP-CAN session establishment/modification, the Dual Connectivity indication may be provided by the MME to the PCRF, PGW-C and PGW-U, by extending S11, Gx and Sx (PFCP) protocols.

The Reinforcement Learning, RL, based RAT Type feature may be enabled by a Policy and Charging Rules Function, PCRF, on a per user's IP-CAN session basis, specifically in case of Dual Connectivity. Both the indication of Dual Connectivity and the activation of the RL based RAT Type feature may then be conveyed to PGW-U via PGW-C upon user's IP-CAN session establishment/modification, by extending Gx and Sx (PFCP) protocols.

At PGW-U, a Reinforcement Learning Agent may take decisions on the enforcement, e.g. Traffic Optimization, actions, i.e. action space, to apply to a user's application session.

At PGW-U, a RAT Type Estimation module may act as the RL environment, sending to the RL Agent the corresponding states and rewards.

At PGW-U, the network operator might use historic traces with different RAT Types to train the model.

From a high-level point of view, the RL based solution may be based on the following steps:

1. PGW-U associates to PGW-C indicating that it supports the RL-based RAT Type feature.

2. A user establishes an IP-CAN session with Dual Connectivity, both 4G RAN and 5G RAN. PCRF, based both on the Dual Connectivity indication from MME and on the subscriber policy profile from SPR, may activate the RL-based RAT Type feature in PGW-C, for example by means of extending the Gx protocol.

3. PGW-C may select a PGW-U supporting the RL-based RAT Type feature and activates it, for example by means of extending the Sx/PFCP protocol.

4. The user starts an application. The RAT Type Estimation module processes application's traffic and may try to estimate the RAT Type. The RAT Type Estimation module may send to the RL Agent the state, e.g. the estimated RAT Type or "unestimated RAT Type" state, and the associated reward.

5. Based on the received state and reward, the RL agent may learn the effect of the past enforcement, e.g. Traffic Optimization, action decisions.

6. The RL agent may take the enforcement, e.g. Traffic Optimization, action decisions based on the received state, the received reward, the set of possible actions, Traffic Optimization action space, whether it's on exploration or exploitation mode, the learned policies, etc.

7. Steps 4-6 may take place sequentially.

Figure 5:
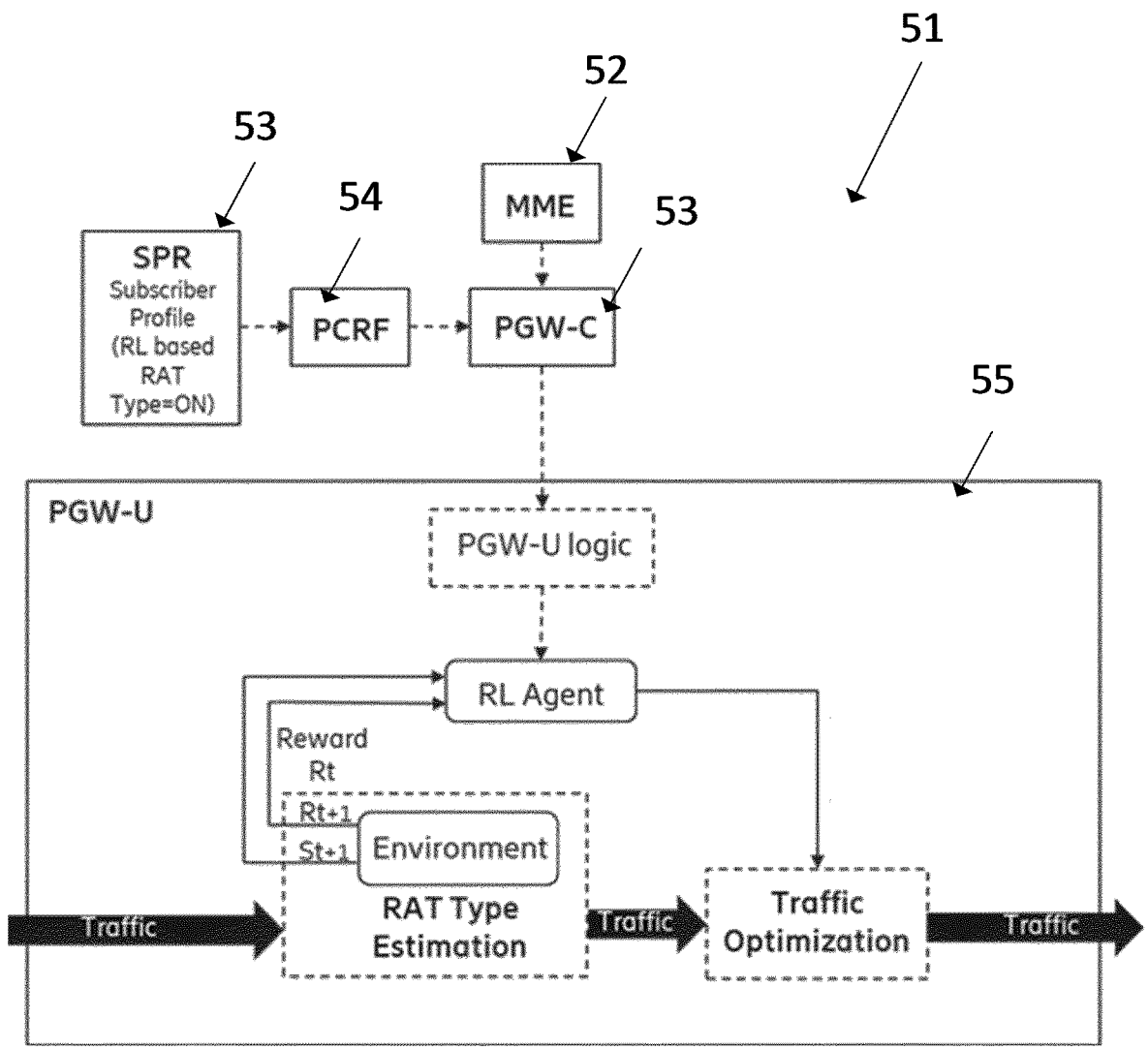
FIG. 5 discloses an architecture of a machine learning solution in accordance with the present disclosure.
Figure 6:
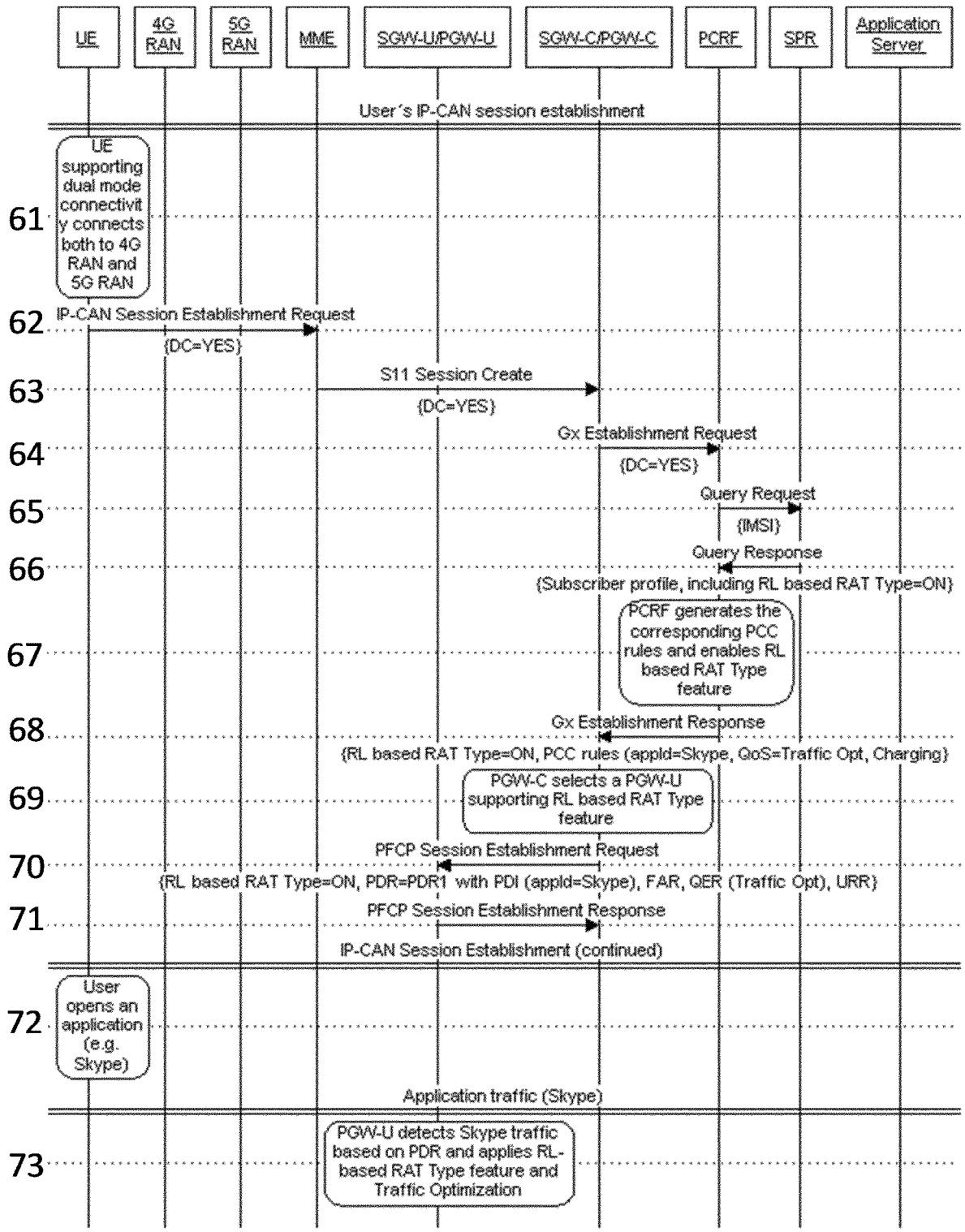
FIG. 6 discloses a sequence diagram in which the PGW-U is arranged to detect the RAT type used by the UE, in accordance with the present disclosure.

The above is explained in a bit more detail with respect to FIGS. 5 and 6.

Figure 2:
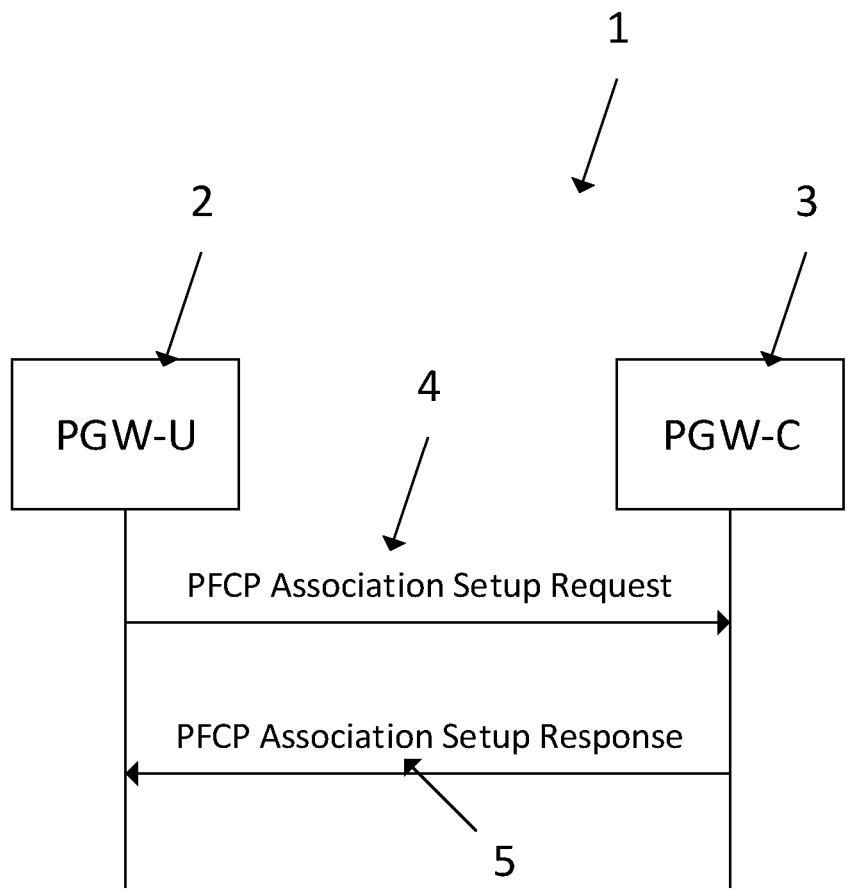
FIG. 2 discloses a PFCP extension to support RAN exposure of RAT type feature negotiation in accordance with the present disclosure.

FIG. 2 depicts an association procedure 1 between the PGW-U and the PGW-C, including the PFCP extension to support the RAN exposure of RAT type feature negotiation.

At step 1): When the PGW-U 2 is deploying the in the network, it may first need to associate to a PGW-C 3. To that extent, the PGW-U may send to PGW-C a PFCP Association Setup Request message 4 including the UP function features it supports. It may also includes the indication of a new feature: the support of RAN Exposure of RAT Type. In other words, the support of the RAN to include the RAT type in the traffic conveyed. This would allow PGW-C to know which PGW-Us support this capability and thus can influence on PGW-U selection.

At step 2): The PGW-C 3 replies to the association request with a PFCP Association Setup Response message 5 including the CP function features it supports. It may also include the indication of a new feature, i.e. the support of RAN exposure of RAT type as disclosed above.

It is noted that step 1 may be triggered by the PGW-U 2 or by the PGW-C 3. In case it is triggered by PGW-C 3, the PGW-C 3 may send the association request message to PGW-U 2 including the CP features and the response includes the UP features.

FIGS. 3 and 4 disclose a sequence diagram in which the access node inserts the RAT type in the packets originating from the UE, in accordance with the present disclosure.

The steps are summarized in a bit more detail here below.

Steps 21 and 22): The UE supporting dual mode connectivity connects both to 4G RAN and 5G RAN and triggers IP-CAN session establishment procedure, by means of sending an IP-CAN Session Establishment Request to MME. This message includes an indication to MME that this IP-CAN session is to be established with dual mode connectivity.

It is noted that the sequence diagram in FIGS. 3 and 4 does not include all the signalling messages involved in the IP-CAN Session Establishment procedure. The relevant signalling messages for the disclosure are described in subsequent steps.

Step 23) The Mobility Management Entity, MME, selects an SGW-C/PGW-C instance to manage the IP-CAN session. This selection can, for example, be based on local configuration of SGW-C/PGW-C instances at the MME. For simplicity, it is assumed that both SGW-C and PGW-C are collocated. The MME triggers S11 Session Create towards SGW-C/PGW-C including an indication that this IP-CAN session is to be established with dual mode connectivity.

Step 24) The PGW-C triggers Gx Establishment Request message towards PCRF to retrieve the policies for the user's IP-CAN session, including an indication that this IP-CAN session is to be established with dual mode connectivity.

Step 25) The PCRF triggers a Query Request message to SPR database to retrieve the policy data for this user's IP-CAN session, including the IMSI to identify the subscriber.

Step 26) SPR answers with a Query Response message including the Subscriber Policy Data, which includes a policy to enable the RAN Exposure of RAT Type feature.

Step 27) PCRF generates the corresponding PCC rule/s based on Subscriber Policy Data. As the IP-CAN session is with dual mode connectivity, it decides to enable the RAN Exposure of RAT Type feature.

Step 28) Based on the above, PCRF triggers Gx Establishment Response message including the PCC rule/s to be applied for this user IP-CAN session. In this case, as an example, there will be a PCC rule for Skype application including some enforcement actions, i.e. Charging and QoS, specifically Traffic Optimization. The Gx Establishment Response message may also include a request to enable the RAN Exposure of RAT Type feature.

Step 29) Based on the request to enable the RAN Exposure of RAT Type feature, PGW-C selects a PGW-U supporting RAN Exposure of RAT Type feature.

Step 30) PGW-C triggers PFCP Session Establishment Request message including the corresponding PDRs/FARs/QERs/URRs. In this case, there will be a PDR with PDI of type application with appId=Skype, and a corresponding FAR, QER and URR. It is proposed to extend the PFCP Session Establishment Request message by creating a new IE to request to enable the RAN Exposure of RAT Type feature.

Step 31) PGW-U stores the PDRs/FARs/QERs/URRs and answers back to PGW-C with a PFCP Session Establishment Response message.

Steps 32 and 33) User opens, i.e. starts, an application, e.g. Skype. In this example sequence diagram, it is assumed UE is on 5G RAN, so the application traffic reaches the 5G RAN.

Steps 34 and 35) The 5G RAN, i.e. the access node in the 5G RAN for example the gNodeB, inserts in the GTP-U header the RAT Type=5G RAN.

Step 36) PGW-U extracts the RAT Type from the GTP-U header, decapsulates the application traffic, i.e. in GTP-U payload, detects Skype traffic based on PDR and applies Traffic Optimization based on the RAT Type.

Step 37) PGW-U forwards the application traffic towards the application server.

FIG. 5 discloses an architecture 51 of a machine learning solution in accordance with the present disclosure.

Here, the MME is indicated with reference numeral 52, the PGW-C is indicated with reference numeral 53, the PCRF is indicated with reference numeral 54 and the Subscriber Profile Repository, SPR, is indicated with reference numeral 53. In any point of time, the PGW-C 53 indicates to the PGW-U 55 that reinforcement learning is to be enables based on RAT type.

FIG. 6 discloses a sequence diagram in which the PGW-U is arranged to detect the RAT type used by the UE, in accordance with the present disclosure.

Steps 61 and 62) The UE supporting dual mode connectivity connects both to 4G RAN and 5G RAN and triggers IP-CAN session establishment procedure, by means of sending an IP-CAN Session Establishment Request to MME.

This message includes an indication to MME that this IP-CAN session is to be established with dual mode connectivity. Note the sequence diagram in FIG. 5 does not include all the signaling messages involved in the IP-CAN Session Establishment procedure. The relevant signaling messages for the lvD are described in subsequent steps.

Step 63) The MME selects an SGW-C/PGW-C instance to manage the IP-CAN session. This selection may be based on local configuration of SGW-C/PGW-C instances at MME. For simplicity, it is assumed that both SGW-C and PGW-C are collocated. MME triggers S11 Session Create towards SGW-C/PGW-C including an indication that this IP-CAN session is to be established with dual mode connectivity.

Step 64) PGW-C triggers Gx Establishment Request message towards PCRF to retrieve the policies for the user's IP-CAN session, including an indication that this IP-CAN session is to be established with dual mode connectivity.

Step 65) PCRF triggers a Query Request message to SPR database to retrieve the policy data for this user's IP-CAN session, including the IMSI to identify the subscriber.

Step 66) SPR answers with a Query Response message including the Subscriber Policy Data, which includes a policy to enable the RL based RAT Type feature.

Step 67) PCRF generates the corresponding PCC rule/s based on Subscriber Policy Data. As the IP-CAN session is with dual mode connectivity, it decides to enable the RL based RAT Type feature.

Step 68) Based on the above, PCRF triggers Gx Establishment Response message including the PCC rule/s to be applied for this user IP-CAN session. In this case, as an example, there will be a PCC rule for Skype application including some enforcement actions, Charging and QoS, specifically Traffic Optimization. The Gx Establishment Response message will also include a request to enable the RL based RAT Type feature.

Step 69) Based on the request to enable the RL based RAT Type feature, PGW-C selects a PGW-U supporting RL based RAT Type feature.

Step 70) PGW-C triggers PFCP Session Establishment Request message including the corresponding PDRs/FARs/QERs/URRs. In this case, there will be a PDR with PDI of type application with appId=Skype, and a corresponding FAR, QER and URR. It is proposed to extend the PFCP Session Establishment Request message by creating a new IE to request to enable the RL based RAT Type feature.

Step 71) PGW-U stores the PDRs/FARs/QERs/URRs and answers back to PGW-C with a PFCP Session Establishment Response message.

Step 72) User opens (starts) an application (e.g. Skype).

Step 73) PGW-U detects Skype application traffic based on the PDR information indicated above. If there is a match, packets are classified as Skype and the RL-based RAT Type feature will be applied.

Some advantages of the methods in accordance with the present disclosure include:

The Network Operator may apply different enforcement actions based on the current RAT Type, specifically in the case of Dual Connectivity in 5G NSA Option 3 scenario:
  User plane traffic optimization, where the TCP/QUIC Optimization profile depends on the actual RAT Type.
  Charging/Reporting per RAT Type (e.g. reporting of service usage in a given RAT, or service chaining counters of users in a given RAT, that could be used for licensing of external SFs).

It avoids the need for statically pre-configured traffic optimization actions. The solution allows to adapt to changing network environment (e.g. change of RAT Type) and traffic characteristics.

No human intervention is needed. The solution runs autonomously and the solution works for encrypted traffic.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method of enabling a Gateway User plane (GW-U) node in a core network of a mobile communication network to perform mobility operations based on a type of Radio Access Technology (RAT) used by a User equipment (UE) for conveying Internet Protocol (IP) user data over an IP Connectivity Access Network (IP CAN) bearer in an IP CAN session between said UE and an external IP network, wherein said method comprises the steps of:
  receiving, by a Gateway Control plane (GW-C) node, a Session Create message for creating said IP CAN session between said UE and said external IP network;
  transmitting, by said GW-C node, an Establishment Request message towards a Policy and Charging Rules Function (PCRF) node, for retrieving policies for said IP CAN session;
  receiving, by said GW-C node, an Establishment Response message, wherein said Establishment Response message comprises an indication being one of:
    an indication that an access node in a Radio Access Network (RAN) is to insert type of RAT in a IP user data packet;
    an indication that a GW-U node is to determine said RAT type by implementing a Reinforcement Learning Agent (RLA) operating with an observation space comprising possible RAT types, a reward space comprising a reward referring to said RAT type, and an action space comprising a set of user plane traffic enforcement actions;
  selecting, by said GW-C node, a GW-U node, based on said indication;
  transmitting, by said GW-C node, a Session Establishment Request message to said selected GW-U node, wherein said Session Establishment Request message comprises said indication.

2. The method of claim 1, wherein said IP-CAN session has Dual Connectivity configured such that said UE is able to connect to said core network using two types of RATs.

3. The method of claim 1, wherein said mobile communication network is a fifth Generation, Non-Standalone based mobile communication network.

4. A non-transitory computer-readable medium having, stored thereupon, computer program instructions configured so that, when executed on a node in a mobile communication network, the computer program instructions cause said node to implement the method of claim 1.

5. A method of performing mobility operations, in a mobile communication network, based on a type of Radio Access Technology (RAT) used by a User equipment (UE) for conveying Internet Protocol (IP) user data over an IP Connectivity Access Network (IP CAN) bearer in an IP CAN session between said UE and an external IP network, wherein said method comprises the steps of:
- receiving, by a Gateway User plane (GW-U) node, over an IP CAN bearer, an IP user data packet;
- determining, by said GW-U node, said a RAT type used by said UE for conveying said IP user data and determining a rule applicable for said IP user data packet based on said determined RAT type, said determining of the RAT type comprising any of retrieving, by said GW-U node, said RAT type from said IP user data packet, and
  - determining, by said GW-U node, said RAT type by implementing a Reinforcement Learning Agent (RLA) operating with an observation space comprising possible RAT types, a reward space comprising a reward referring to said RAT type, and an action space comprising a set of user plane traffic enforcement actions; and
- performing, by said GW-U node, a mobility operation based on said applicable rule.

6. A Gateway Control plane (GW-C) node for enabling a Gateway User plane (GW-U) node in a core network of a mobile communication network to perform mobility operations based on a type of Radio Access Technology (RAT) used by a User equipment (UE) for conveying Internet Protocol (IP) user data over an IP Connectivity Access Network (IP CAN) bearer in an IP CAN session between said UE and an external IP network, wherein said GW-C node comprises:
- receive circuitry configured to receive a Session Create message for creating said IP CAN session between said UE and said external IP network;
- transmit circuitry configured to transmit an Establishment Request message towards a Policy and Charging Rules Function (PCRF) node, for retrieving policies for said IP CAN session;
- wherein:
  - the receive circuitry is further configured to receive an Establishment Response message, wherein said Establishment Response message comprises an indication being one of:
    - an indication that an access node in a Radio Access Network (RAN) is to insert type of RAT in a IP user data packet, and
    - an indication that a Gateway User plane node is to determine said RAT type by implementing a Reinforcement Learning Agent (RLA) operating with an observation space comprising possible RAT types, a reward space comprising a reward referring to said RAT type, and an action space comprising a set of user plane traffic enforcement actions;
  - and wherein said GW-C node further comprises:
    - processing circuitry configured to select a Gateway User plane (GW-U) node, based on said indication;
  - and wherein said transmit circuitry is further configured to transmit a Session Establishment Request message to said selected GW-U node, wherein said Session Establishment Request message comprises said indication.

7. A Gateway User plane (GW-U) node, arranged for performing mobility operations, in a mobile communication network, based on a type of Radio Access Technology (RAT) used by a User equipment (UE) for conveying Internet Protocol (IP) user data over an IP Connectivity Access Network (IP CAN) bearer in an IP CAN session between said UE and an external IP network, wherein said GW-U node comprises:
- receive circuitry configured to receive, over an IP CAN bearer, an IP user data packet; and
- processing circuitry configured to determine a RAT type used by said UE for conveying said IP user data and determine a rule applicable for said IP user data packet based on said determined RAT type and perform a mobility operation based on said applicable rule;
- wherein said processing circuitry is configured to determine said RAT type by any of:
  - retrieving, by said GW-U node, said RAT type from said IP user data packet; and
  - determining, by said GW-U node, said RAT type by implementing a Reinforcement Learning Agent (RLA) operating with an observation space comprising possible RAT types, a reward space comprising a reward referring to said RAT type, and an action space comprising a set of user plane traffic enforcement actions.

* * * * *